July 21, 1964 A. NOVICK 3,141,667
DEVICE FOR FEEDING ENVELOPE BLANKS
Filed May 12, 1961 7 Sheets-Sheet 1

INVENTOR
ABRAHAM NOVICK
BY
Moses, Nolte, & Nolte
ATTORNEYS

July 21, 1964      A. NOVICK      3,141,667
DEVICE FOR FEEDING ENVELOPE BLANKS
Filed May 12, 1961      7 Sheets-Sheet 2

INVENTOR
*ABRAHAM NOVICK*
BY
*Moses, Nolte, & Nolte*
ATTORNEYS

July 21, 1964 A. NOVICK 3,141,667
DEVICE FOR FEEDING ENVELOPE BLANKS
Filed May 12, 1961 7 Sheets-Sheet 3

INVENTOR
ABRAHAM NOVICK
BY Moses, Nolte, & Nolte
ATTORNEYS

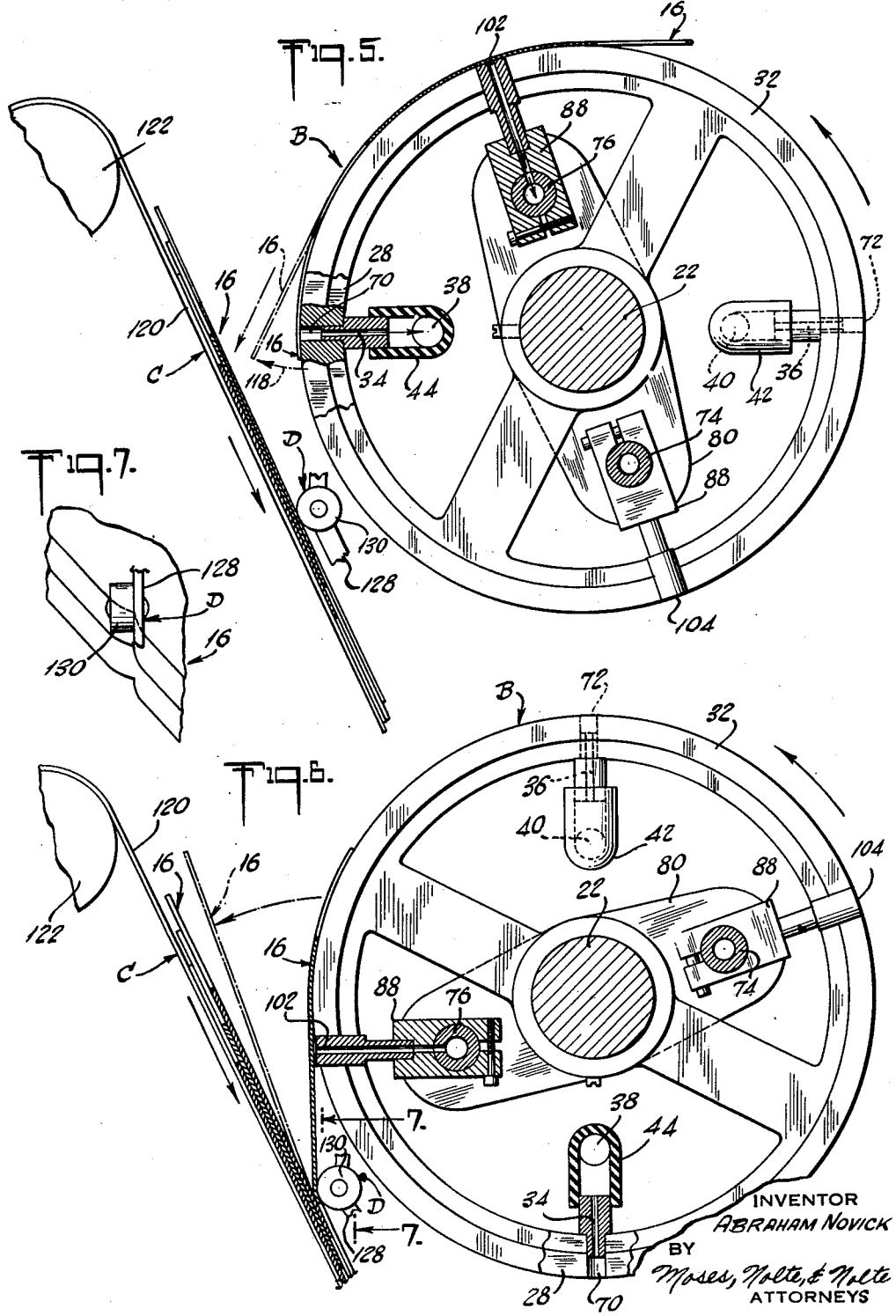

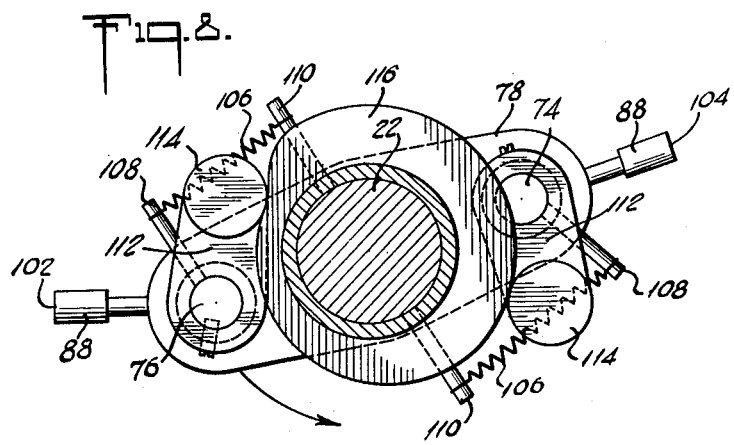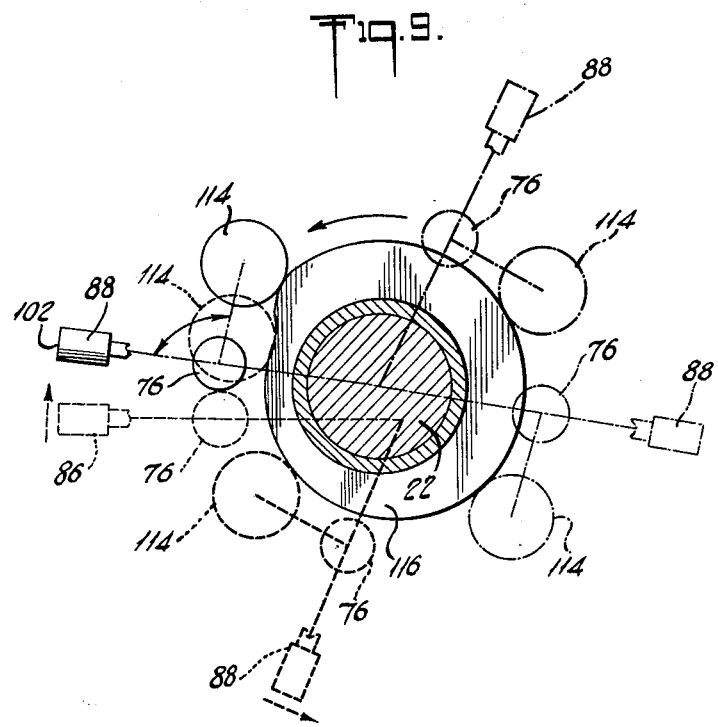

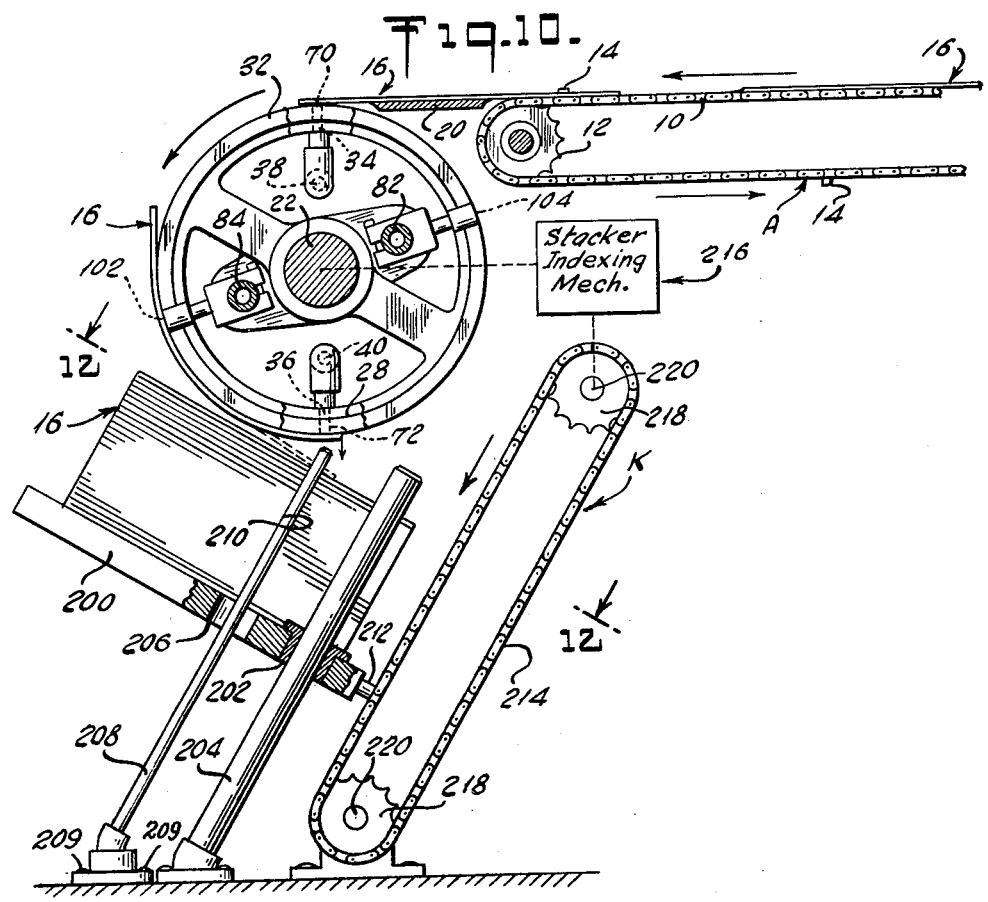
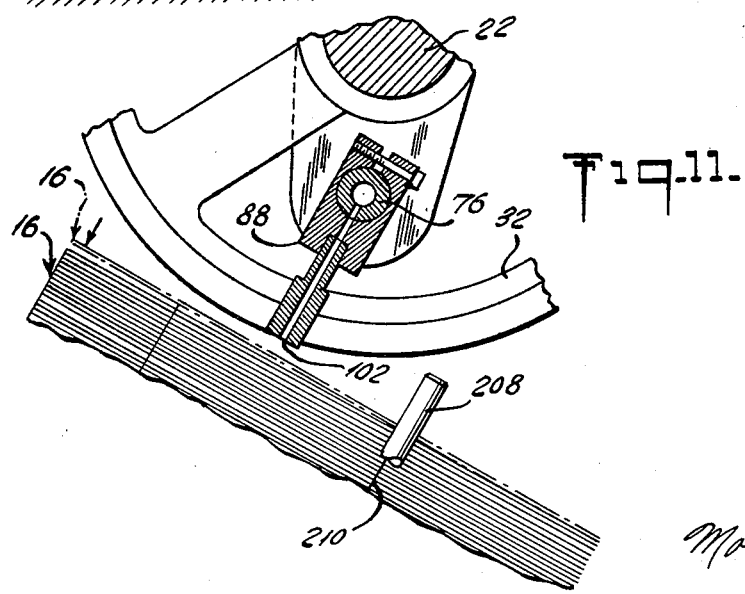

July 21, 1964     A. NOVICK     3,141,667
DEVICE FOR FEEDING ENVELOPE BLANKS

Filed May 12, 1961     7 Sheets-Sheet 7

INVENTOR
ABRAHAM NOVICK
BY
Moses, Nolte, & Nolte
ATTORNEYS

United States Patent Office 3,141,667
Patented July 21, 1964

3,141,667
DEVICE FOR FEEDING ENVELOPE BLANKS
Abraham Novick, Flushing, N.Y., assignor to F. L. Smithe Machine Co., Inc., New York, N.Y., a corporation of New York
Filed May 12, 1961, Ser. No. 112,157
19 Claims. (Cl. 271—74)

This application is a continuation-in-part of applicant's prior copending application Serial No. 716,298 filed February 20, 1958, now abandoned.

This invention relates in general to improved high-speed and high accuracy envelope blank transfer apparatus used in envelope making machines and particularly to new and useful improved apparatus for continuously positioning a series of envelope blanks in fanned-out overlapping relationship with the marginal edges of the blanks offset a predetermined amount, and for thereafter effecting a continuous application of an adhesive to the blanks along the marginal edges or for stacking said envelope blanks.

In the making of envelopes, it is usual to feed each blank in succession either away from a stack of such blanks, or to feed blanks in succession away from a prior machine operation station into a stack or to arrange the blanks in fanned-out relationship, with their sealing flap edges offset a predetermined amount to permit the continuous application of glue or gum by a roller gummer to the marginal edges of the blanks. Normally the blanks have to be transferred from a fast feeding mechanism to a slow feeding mechanism while arranging them in an orderly fanned-out fashion. The blanks are then continuously advanced in contact with a glue-applying roller to effect the continuous application of glue along the marginal edges of the sealing flap. In machines of this character, it is most desirable to have apparatus which is effective to arrange the blanks in the fanned-out relationship in as rapid a manner as possible commensurate with preserving the accuracy of alignment of the blanks and the prevention of any jamming or tearing in the blank feeding.

In Patent No. 2,782,898 issued February 26, 1957 to the present inventor there is disclosed and claimed an envelope collating mechanism of this general nature. The present invention is an improvement over the aforementioned patent particularly in respect to the mechanism for effecting the high speed feeding of blanks into a precise fanned-out arrangement and for applying adhesive to the marginal edges of the blanks.

In accordance with the present invention, there is provided an apparatus capable of arranging a series of envelope blanks in fanned-out overlapping relationship with accuracy and reliability, and for thereafter applying adhesive to their marginal edges at very high rates of speed. The apparatus includes rotary means for grasping the forward and trailing portions of each blank as it is advanced and positioning the blank on a moving conveyor with its sealing edge located at a precise offset position from the previously fed blank. The trailing portion grasping means further includes means to vary the angular velocity of the grasping means with respect to the main rotary means so that a controlled, relatively slow speed, deposition of the blank is effected onto the moving conveyor or to an alternative blank stacking means.

Accordingly, it is an object of the invention to provide a high speed and high accuracy rotary blank transfer means.

Another object of the invention is to provide a rotary transfer means employing a variable speed blank holding means thereon.

A still further object of the invention is to provide a blank transfer means wherein the forward portion of the blank is transferred to the control of a receiving conveyor or stacker means while the trailing portion of the blank is still under the control of the transfer means.

Yet another object of the invention is to provide an improved high-speed rotary transfer means wherein the blank secured therein is decelerated just prior to release therefrom.

Another object of this invention is to provide an improved envelope sealing flap glue applying apparatus.

A further object of the invention is to provide an improved high-speed mechanism for arranging envelope blanks in a fanned-out overlapping position on a moving conveyor.

A further object of the invention is to provide an apparatus of the character described, which is simple in design, rugged in construction, and economical to manufacture.

The various features of novelty which characterize the invention are pointed out with particularity in the claims annexed to and forming a part of the specification. For a better understanding of the invention, its operating advantages, and specific objects obtained by its use, reference should be had to the accompanying drawings and descriptive matter in which there is illustrated and described a preferred embodiment of the invention.

In the drawings:

FIG. 5 is an enlarged fragmentary vertical section partly broken away of a portion of the mechanism shown in FIG. 1 indicating the position of the parts during the feeding of a blank from the vacuum roller onto the moving conveyor;

FIG. 6 is a view similar to FIG. 5 but showing the envelope blanks and the operating parts in a more advanced position of feeding;

FIG. 7 is a fragmentary sectional view taken along the line 7—7 of FIG. 6;

FIG. 8 is a vertical section taken along the line 8—8 of FIG. 2;

FIG. 9 is a view similar to FIG. 8 with portions of the parts removed for clarity and showing the parts in the positions they assume during various phases of the feeding operation;

FIG. 10 is a somewhat schematic view similar to FIG. 1 showing the use of the invention as a high-speed stacker delivery;

FIG. 11 is an enlarged fragmentary view of a portion of FIG. 10 after release of the blank onto the stacker.

Figure 1:
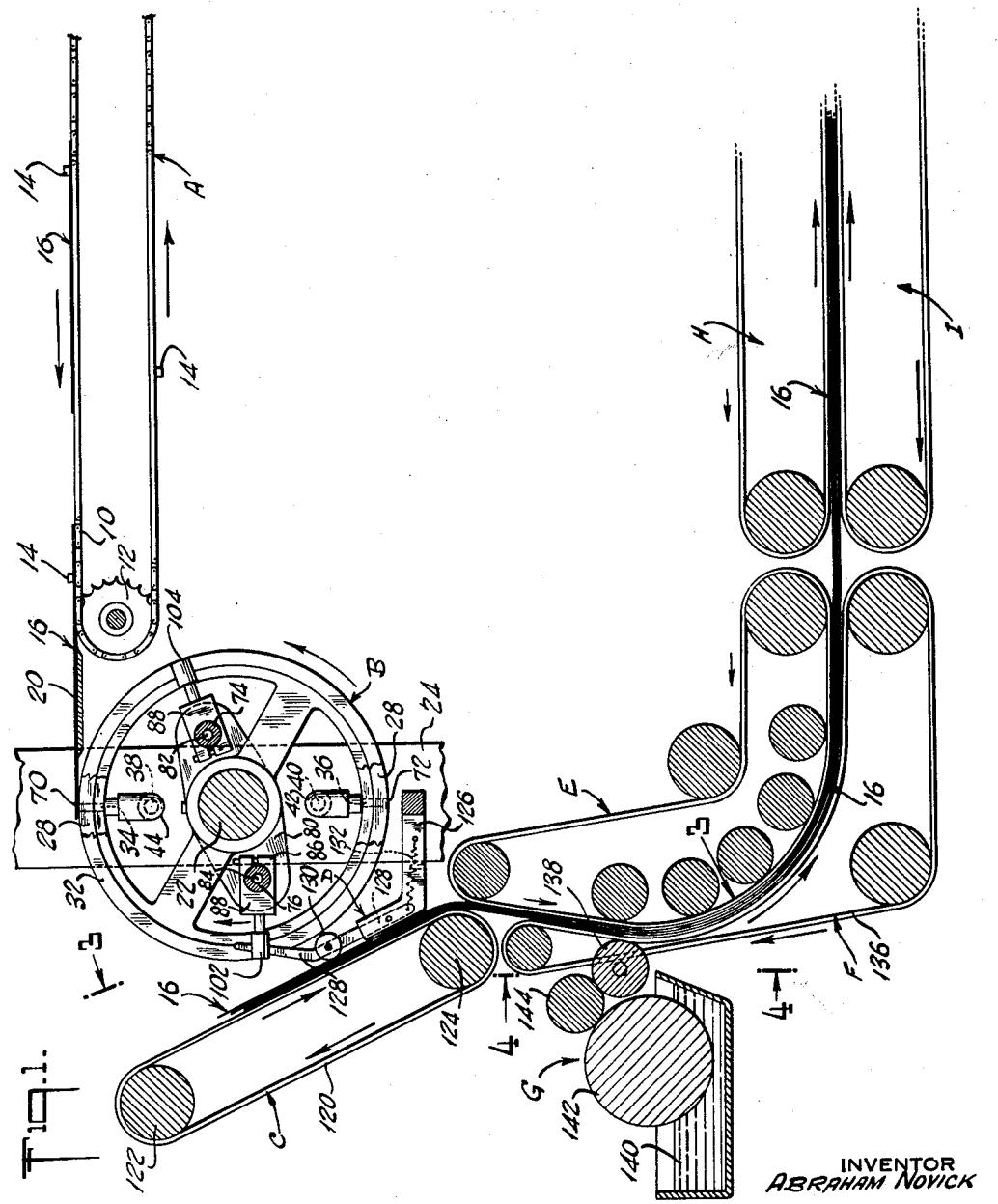
FIG. 1 is a somewhat schematic vertical section taken along line 1—1 of FIG. 2 of a portion of an envelope making machine having improved means for arranging the blanks in fanned-out relationship and for feeding to a glue applicator roller, as constructed in accordance with the invention.

Referring to the FIGS. 1 to 9 in particular, the invention as embodied therein includes portions of an envelope-making machine including a conveyor A for advancing each blank in succession which has been fed to the conveyor from prior envelope machine operating mechanism (not shown). Each blank advanced on the conveyor A is moved into association with rotating suction mechanism generally designated B which is effective to move each blank in succession through an arc and onto a moving conveyor generally designated C. Holding and positioning mechanism generally designated D is effective to hold each blank in a fanned-out position as it is advanced by the conveyor C.

The blanks are then advanced from the conveyor C between two cooperating conveyors, a solid belt conveyor E, and a spaced parallel belt conveyor F. The spaced parallel belt conveyor F is effective to hold the blanks at each side, while they are advanced into operative association with glue-applying mechanism G. Glue is continuously applied along the marginal edges of the sealing flaps of each blank as it is advanced. The blanks are then fed by the conveyors E and F into association with cooperating conveyors H and I where further operations are performed upon the blanks by mechanism (not shown) to effect their final formation into an envelope.

The conveyor A includes a pair of spaced parallel endless chains 10, 10 which are continuously moved by power activated sprocket wheels 12, 12. Each chain 10 is provided with laterally aligned pins 14, 14 which engage the trailing edge of each envelope blank, generally designated 16, at each side of a sealing flap 18.

The blanks 16 are aligned as they are advanced by the pins 14, the latter being effective to push each blank in succession onto a table 20 with the forward edge of the blank projecting beyond the table into operative association with the vacuum rotating transfer mechanism B.

The vacuum rotating transfer mechanism B includes a main drive shaft 22 which is continuously rotated by a power source (not shown). The shaft 22 is mounted for rotation in suitable bearings in frame members 24 and 26. Affixed to the shaft 22 for rotation therewith are three vacuum wheel assemblies including a central roller or wheel 28 and side rollers or wheels 30 and 32.

In accordance with the invention, the central roller is provided with two diametrically opposite radially extending passages 34 and 36 which extend to the outer periphery of the roller 28 and connect to manifolds 38 and 40, respectively. Each of the manifolds 38 and 40 is connected through a flexible hose 42 and 44, respectively, which in turn are connected at diametrically opposite positions to internally drilled passages 46 and 48 capped near the frame 24 by a removable plug 50 which is screwed onto the end of the shaft.

The passages 46 and 48 communicate with interior passages 52 and 54, respectively, which are formed in an annular bearing ring 56 keyed to the shaft 22 adjacent the frame 24. The ring 56 is provided with an annular groove in which is rotatably fitted a vacuum slip ring 58. The slip ring 58 is held to the frame 24 by means of a bolt 60 while the ring 56 is permitted to rotate freely with the shaft 22. The slip ring 58 is connected to vacuum producing apparatus (not shown) through flexible tubing 62 and 64.

Timing of the application of vacuum to the manifolds 38 and 40, is done by varying the peripheral extent of the passages 52 and 54 on the surface of the ring 56 which will be in communication with passages 66 and 68 drilled in the slip ring 58. Thus, vacuum will be applied and removed at two diametrically opposite locations 70 and 72 adjacent the periphery of the central roller 28, in accordance with the angular position of these points as the roller is rotated, as controlled by the alignment of the passages in the slip ring 58 and the ring 56.

In accordance with the invention, means are incorporated with the movement of the shaft 22 and the three rollers 28, 30 and 32 to supply vacuum at locations to effect gripping of each side of the blank 16 adjacent its trailing edge, including two manifolds 74 and 76 held in diametrically opposite positions by spaced clamping elements 78 and 80. The clamping elements 78 and 80 are fixed to the shaft 22 and the manifolds 74 and 76 are rotatably mounted in the elements.

The manifolds 74 and 76 are provided with internal passages 82 and 84, respectively, which communicate with internal passages located in a respective one of a pair of gripper elements 86, 86 secured to a respective manifold adjacent the roller 30, or communicate with internal passages in a respective one of a pair of gripper elements 88, 88 affixed to a respective manifold adjacent the roller 32. The passages 82 and 84 communicate with an annular chamber 90 formed in an annular housing 92 affixed to the shaft 22. Vaccum is applied to the chamber 90 through passages 94, 94 in the housing 92 and passages 96, 96 in a slip ring 98. The passages 96, 96 are connected to a source of vacuum through hoses 100 and 101. The passages 96, 96 become intermittently aligned with housing passages 94, 94 upon rotation of the housing with the shaft 22. The slip ring 98 is held against rotation by the bolt 60. The timing is such that a vacuum is intermittently applied and removed from the diametric oppositely located openings 102 and 104 adjacent the periphery of each of the outboard rings 30 and 32, to effect envelope blank gripping as described hereinafter.

Figure 2:
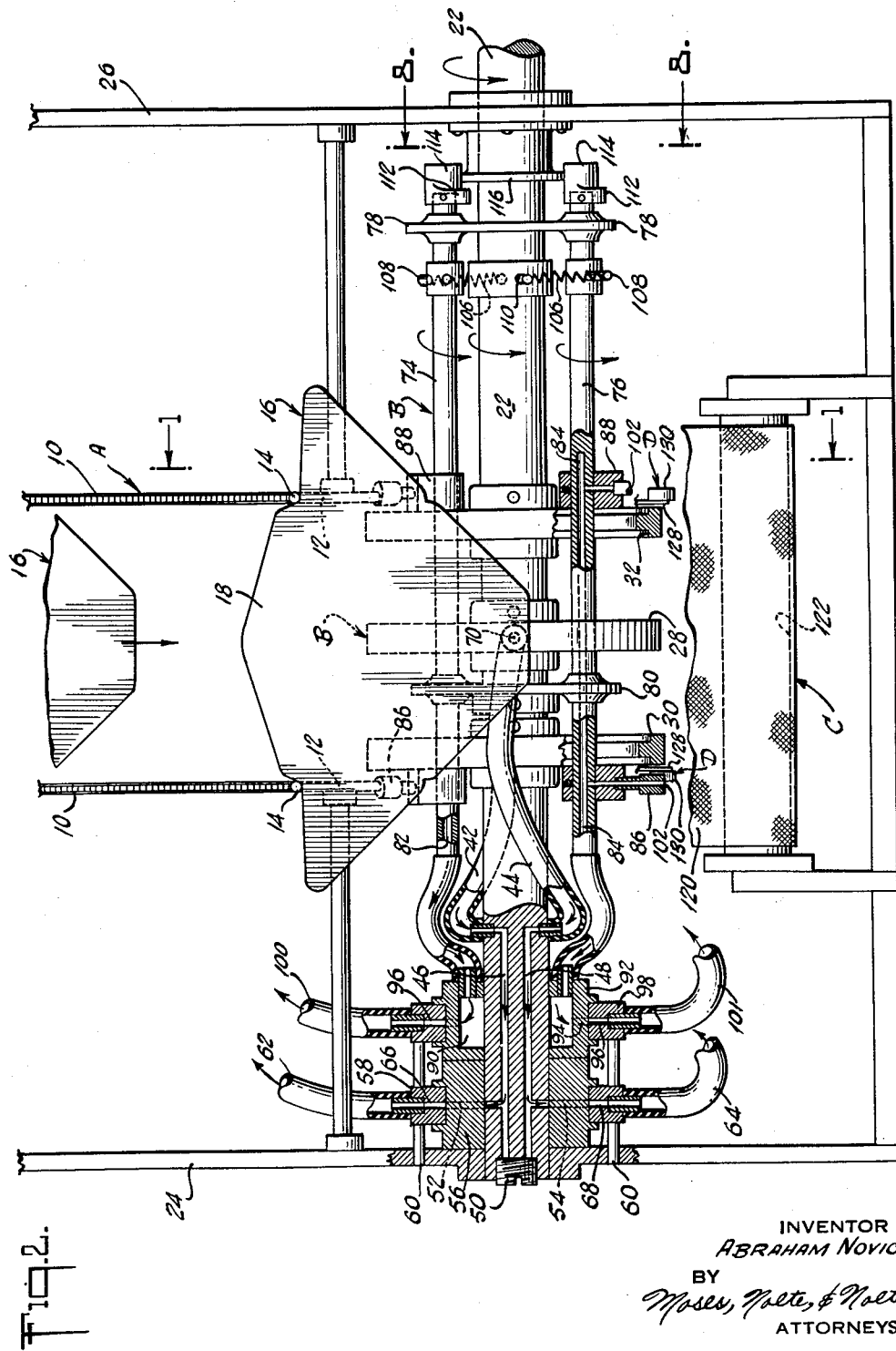
FIG. 2 is a fragmentary top plan view partly in section of the apparatus shown in FIG. 1.
Figure 3:
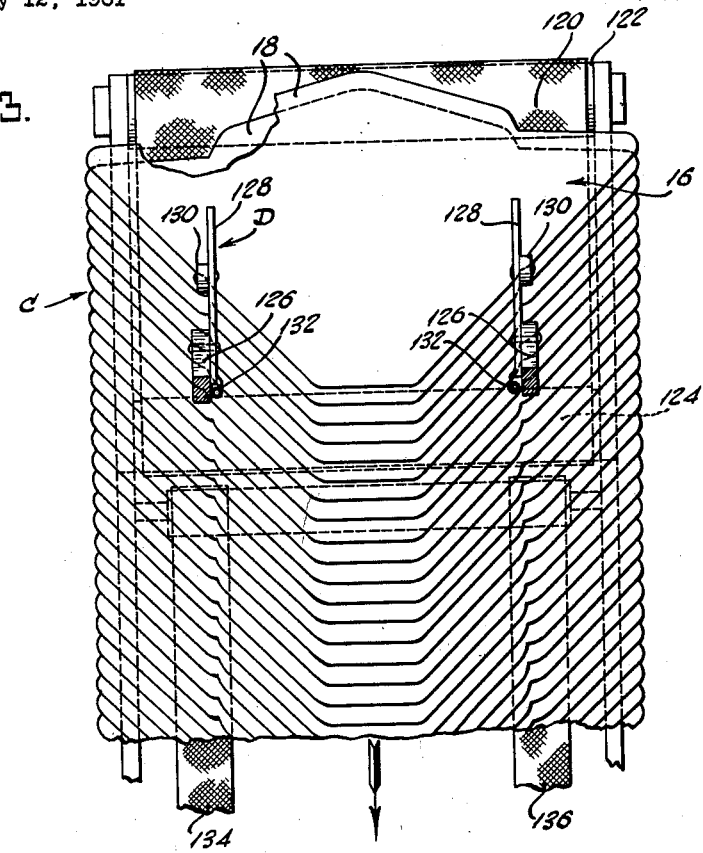
FIG. 3 is a fragmentary sectional view taken on the line 3—3 of FIG. 1.
Figure 4:
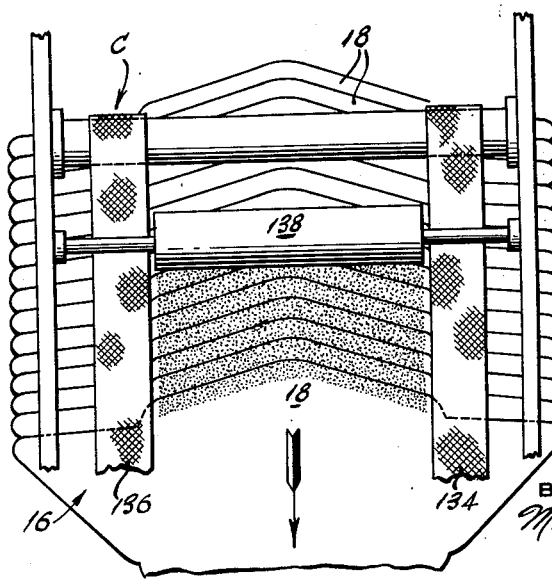
FIG. 4 is a fragmentary sectional view taken on the line 4—4 of FIG. 1.

In accordance with the invention each of the manifolds 74 and 76 is biased in a direction opposite the direction of rotation indicated in FIGS. 2, 8 and 9 by tension springs 106, 106 which are held between a lug 108, 108 on a respective manifold and a lug 110, 110 on the shaft 22. The manifolds 74 and 76 are arranged for rotation in an orbit around the shaft 22 and are rotatable about their own axes. The rotation about their own axes is affixed by lever arms 112, 112 which are affixed to a respective manifold and are provided with roller followers 114, 114 which ride on a cam 116 which is affixed to the frame 26. The rotation of a manifold 74, 76 under the influence of the cam 116, effects movements of the gripper elements 86, 86 and 88, 88 backwardly in a direction contrary to the rotation of the rollers 30 and 32 as indicated in FIGS. 1, 8, 9 and 6. This movement, contrary to the rotation of the rollers 30 and 32 is effected to slow down the feeding of each blank to the conveyor feed when the blank is ready for release on to the conveyor, as will be described more fully hereinafter.

The blanks 16, which are fed by the conveyor A to the position on the table 20 indicated in FIG. 2, are grasped in the center of the leading edge by vacuum applied through the roller 28 at the location 70. This vacuum is effected at this precise position of the roller 28 by the alignment of the passages 52 and 54 with the passages 66 and 68 and the source of the vacuum. The vacuum is maintained at the location 70 until the roller 28 rotates around to the position indicated in FIG. 5, at which point the passages 52, 54 and 66 and 68 no longer align and vacuum is cut off at the location 70. The forward edge of the envelope blank moves outwardly from the roller 28 in the direction indicated by the arrow 118.

Just prior to the release of the forward edge of the blank 16 by the discontinuance of the vacuum at the location of opening 70, vacuum is applied at the openings 102 on each of the side rollers 30 and 32. The openings 102, 102 are angularly displaced from the location of opening 70 so that the blank 16 is grasped by the vacuum at each side of the blank in the location of the trailing edge thereof. Vacuum is maintained at 102, 102 through the positions indicated in FIGS. 5 and 6. As the gripper elements 86 and 88 approach the position indicated in FIG. 6, the manifolds 74 and 76 are rocked in a direction contrary to the rotation of the rollers 30, 32 to cause the gripper elements 86 and 88 to rock backwardly also, to displace them from radially extending positions backwardly against the direction of rotation. This has the effect of retarding the feeding of the sheet onto the conveyor and effects a smooth and slower feeding and correct positioning of blanks in fanned-out relation with the marginal edges of the sealing flaps 18 spaced at predetermined equal amounts from the next adjacent blanks.

The conveyor C includes an endless belt 120 arranged for movement about two spaced drums 122 and 124. The positioning and holding mechanism D includes an L-shaped bracket 126 which is secured to the frame member 24 and is provided with a pivoted arm 128 having a roller 130 which is biased against the conveyor belt 120 by a tension spring 132.

Each blank 16 is fed to the position indicated in FIG. 5 and the vacuum is released at 70 to cause the forward edge to be deflected against the conveyor belt 120 and the previously fed blank. As the three rollers 28, 30 and 32 together with the gripper elements 86 and 88 are rotated further, the forward edge of the blank is directed under the roller 130 at a location which positions the forward edge of the blank being fed in offset alignment with the forward edge of the previously fed blank, at a location spaced rearwardly therefrom a predetermined amount. The combined movement of the conveyor belt 120 along with the continued rotation of the gripper elements 86 and 88 bring the blank forward on the conveyor as the trailing edge of the blank is brought onto the conveyor in precise offset alignment.

Gripper elements 86 and 88 are moved in accordance with the cam-controlled motions outlined in FIG. 9 to cause them and the blank 16 to move backwardly relative to the rotation of the rollers 30 and 32. The movement is such that the trailing edge of the envelope blank 16 containing the sealing flap 18 is aligned on the conveyor so that the marginal edge of the sealing flap of this blank is brought into position on the conveyor with precisely the correct amount of marginal overlap. The gripper elements 86 and 88 are moved in the manner indicated to effect correct positioning of the blank as well as easy unobstructed feeding without danger of tearing and jamming.

The blanks are fed by the conveyor C in the correct fanned-out position into association with the cooperating belt conveyor E and the spaced parallel conveyor belt F. The spaced parallel conveyor belt F includes two spaced endless belts 134 and 136 (FIGS. 3 and 4) arranged to hold the envelope blanks at their marginal edges as they are moved between the cooperating conveyors. The belts 134 and 136 are spaced sufficiently to permit a glue applicator roller 138 to continuously rotate and apply glue continuously to the marginal edges of the sealing flap 18 of the envelope blanks.

The glue applying mechanism G includes a reservoir of adhesive material 140, in which is rotated a reservoir roller 142. The reservoir roller 142 continuously picks up a supply of adhesive and transfers it to a transfer roller 144 which transfers an even thin layer thereof along the surface of the glue applicator roller 138.

The blanks 16 are then fed by the cooperating conveyors E and F to cooperating conveyors H and I which pass the blanks on for subsequent operations (not shown) such as folding into the correct envelope shape.

Figure 12:
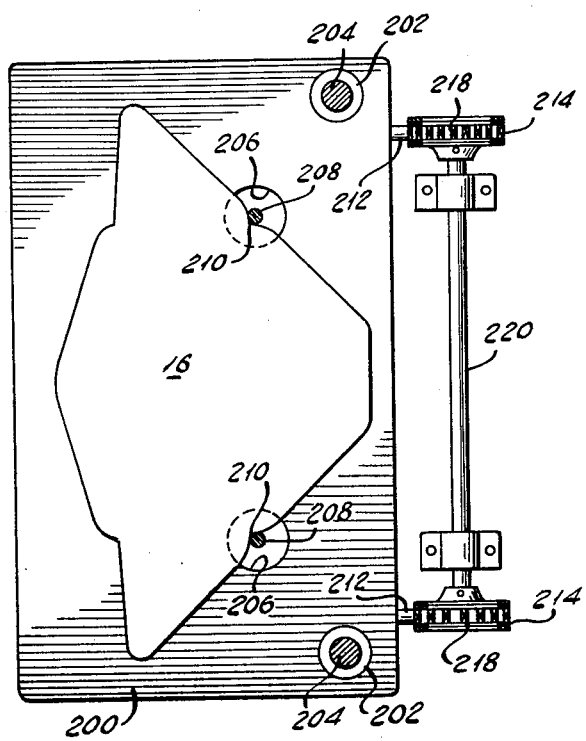
FIG. 12 is a view looking at the stacking means along the section line 12—12 of FIG. 10.

Referring to FIGS. 10, 11 and 12, wherein like numerals refer to like elements in the previous embodiment, another and preferred application of the invention is shown. In these figures the novel rotary suction mechanism B is employed to accurately, and at high speed, deliver blanks to a stacking mechanism generally designated K.

The stacker K includes a stacker plate 200 carrying a pair of bushings 202 which are slidable upon a pair of upstanding posts 204. Projecting through enlarged apertures 206 in the plate 200 are a pair of adjustable upstanding stop pins 208 which are laterally spaced to engage the leading edge notches 210 in each envelope blank as they are being deposited upon the stacker plate. Mounting screws 209 secure the base of the pins 208 to the supporting surface to allow release and repositioning thereof to accommodate blanks of different sizes. The plate 200 carries a pair of drive pins 212 which may be manually reciprocated by the machine operator to engage the plate to spaced drive chains 214 at any desired stack level. The chains 214 are driven through sprockets 218 and shafts 220 in the direction indicated by the stacker indexing mechanism shown generally as 216 in response to the number of revolutions of the shaft 22.

In this application of the invention, extremely high-speed stacking of sheet material is possible without damage to the edges of the material due to the previously described retarding or counter-rotation motion imparted to the suction apertures 102, 104 just prior to release of the blank.

Thus it is apparent that the invention provides very fast operating and accurate apparatus for arranging envelope blanks for the application of glue along the marginal edges of the sealing flap. The apparatus will operate at speeds higher than those obtainable heretofore and will do so with reliability and little danger of clogging or jamming.

While a specific embodiment and two applications of the invention have been shown and described in detail to illustrate uses of the invention principles, it will be understood that the invention may be embodied or employed otherwise without departing from such principles. Those skilled in the art will appreciate that the novel rotary transfer means may be employed in many different fields where accurate deceleration of sheet articles is desired.

I claim:
1. Apparatus for feeding envelope blanks with the edges of each successively fed blank offset and equal predetermined amount comprising, continuously rotating transfer means, means to feed a plurality of envelope blanks in succession to said transfer means, a continuously moving conveyor arranged in proximity to said transfer means, means cooperable with said conveyor to hold each blank fed to said conveyor in a fixed position on said conveyor relative to the next adjacent blank, said transfer means including means for securing each blank thereto and for moving each blank in succession to said conveyor with each succeeding blank positioned over the previously fed blank and with the edges of each successively fed blank offset an equal predetermined amount, said securing means including, first means for grasping the forward edge of each blank advanced by said feeding means and holding it on said transfer means for a predetermined rotation thereof and thereafter releasing said forward edge for deflection to said conveyor, and second means for grasping the trailing portion of each blank prior to release of the forward portion thereof and holding it upon said transfer means for a predetermined rotation thereof and thereafter releasing it onto said conveyor.

2. An envelope feeder according to claim 1, wherein said first means and said second means for grasping each blank includes means for applying a vacuum thereto at preselected rotary locations of said transfer means and thereafter discontinuing said vacuum to effect the timed release of each blank on said conveyor with an edge of each blank offset a predetermined amount from the next adjacent blank.

3. A feeder according to claim 2, wherein said vacuum applying means includes a manifold connected for rotation with said transfer means, conduit means connecting said manifold to the surface of said transfer means, a vacuum chamber connected to said manifold having at least two vacuum timing ports arranged in spaced location on the outer periphery thereof and extending into communication with said member, a stationary vacuum supply chamber surrounding said vacuum chamber and having internal passages which communicate with said vacuum timing ports, and means to rotate said manifold and said vacuum chamber with said wheel to bring said ports into and out of alignment with said vacuum supply member passages.

4. A feeder according to claim 1, including means for moving said second grasping means in a direction opposite to said transfer means direction of rotation as the trailing edge of said blank approaches said conveyor whereby to retard the movement of said blank on said conveyor and position each blank at a predetermined offset position from the previously fed blank.

5. Envelope aligning apparatus comprising continuously rotating roller means, means for continuously feeding a quantity of envelope blanks in succession to said roller means, a continuously moving conveyor arranged to move in proximity to said roller means, means on said roller means to grasp the forward portion of each blank and hold it to said roller means as the roller means is rotated through a portion of a revolution and thereafter release said blank at a location to deflect it to said conveyor, means on said roller means to grasp the trailing portion of said blank prior to the release of the forward portion thereof and to release said trailing edge when the latter is moved on said roller into a position approximately parallel to the surface of said conveyor, and holding and positioning means cooperable with said conveyor to hold each blank in position on said conveyor as it is advanced thereon.

6. An envelope aligning apparatus according to claim 5, including means for moving said means to grasp the trailing portion of said blank in a direction opposite to the direction of rotation of said roller means as the trailing portion of said blank approaches the conveyor whereby to slow down the movement of said blank to said conveyor.

7. Apparatus for feeding envelope blanks with the edges of each successively fed blank offset an equal predetermined amount comprising, continuously rotating means, means to feed a plurality of envelope blanks in succession to said rotating means, a continuously moving conveyor arranged in proximity to said rotating means, said rotating means having first and second means for supplying a vacuum to preselected locations on the periphery of said rotating means to grasp leading and trailing portions of each blank and thereafter discontinuing said vacuum, means to control said second means to effect retarding movement of each blank relative to the surface of said rotating means and to release each blank for positioning on said conveyor with an edge of each blank offset an equal predetermined amount from the next adjacent blank, and means cooperable with said conveyor to hold each blank fed to said conveyor in a fixed position relative to the next adjacent blank.

8. Apparatus according to claim 7 wherein said rotating means includes a central roller and two side rollers.

9. An envelope feeding apparatus according to claim 7, wherein said first and second vacuum supplying means includes a manifold connected to said rotating means, conduit means connecting said manifold to the surface of said rotating means, a vacuum chamber connected to said manifold having at least two vacuum timing ports arranged in spaced locations on the outer periphery thereof and extending into communication with said chamber, an annular vacuum supply member surrounding said vacuum chamber and having internal passages which communicate with said vacuum timing ports, and means to rotate the manifold and said vacuum chamber with said roller rotating means to bring said ports into and out of alignment with said vacuum supply chamber passages.

10. An apparatus according to claim 9, wherein said manifold and said connecting conduit means are movable and are provided with an arm extending outwardly therefrom to engage stationary cam means to move said arm and rotate said manifold and said conduit means.

11. In a machine for successively advancing envelope blanks, the combination including continuously rotating roller means, a continuously moving conveyor arranged in proximity to said roller means, said roller means having a passage extending radially inwardly from the surface thereof, a first manifold connecting said passage and arranged for concentric rotation with said roller means, a second manifold arranged for concentric rotation with said roller means, a gripper element connected to said second manifold and having an internal passage in communication with an internal passage in said second manifold, said passage also extending to the outer surface of said roller means, means to periodically rotate said second manifold and said gripper element to move the outer surface of said element from a position extending radially to the outer surface of said roller means to a position offset from the radial position, means for producing vacuum connected to each of said first and second manifolds, means for intermittently connecting a vacuum supply to said manifolds, said radially extending passage being effective to engage by suction the forward edge of each successively advanced blank and move it around with said roller means and thereafter deflect it to said conveyor, said gripper element being effective to engage by suction the trailing edge of each successively advanced blank just prior to release and to move it around with said roller to said conveyor and release said blank, and means cooperable with said conveyor to hold each blank fed to said conveyor in a fixed position relative to the next adjacent blank.

12. Apparatus according to claim 11 including means to rotate said second manifold backwardly in relation to the direction of rotation of said roller means as each blank is being advanced to said conveyor.

13. In a machine wherein non-overlapping blanks of sheet material are being fed at a high linear speed in sequential relation upon a first continuously running conveyor and are deposited in lapped relation upon a second slower moving continuously running conveyor, the improvement comprising, rotary blank transfer means between said first and second conveyor, said transfer means rotating at a uniform angular velocity and including blank holding means connected to the periphery of said transfer means, means to vary the angular velocity of the blank holding means from the angular velocity of said transfer means, said holding means rotating at the same angular velocity as the transfer means during the interval when the blank is removed from the first conveyor and rotating at an angular velocity less than that of the transfer means during the interval when the blank is released by the holding means upon the second conveyor.

14. In a machine wherein non-overlapping blanks of sheet material are being fed at a high linear speed in sequential relation upon a continuously running conveyor and are delivered to a receiving means in lapped relation the improvement comprising, rotary blank transfer means at the delivery end of said conveyor, said transfer means rotating at a uniform angular velocity and including blank holding means connected to the periphery of said transfer means, means to vary the angular velocity of the blank holding means from the angular velocity of said transfer means, said holding means rotating at the same angular velocity as the transfer means during the interval when the blank is removed from the conveyor and rotating at an angular velocity less than that of the transfer means during the interval when the blank is released by the holding means and delivered to the receiving means.

15. Apparatus as claimed in claim 14 wherein said receiving means includes a blank stacker means.

16. Apparatus as claimed in claim 15 wherein said stacker means includes movable platform means having enlarged apertures therein, blank alignment pin means extending through said apertures, and means to adjust the lateral spacing of said pin means to engage edge portions of the blanks being delivered to said stacker means.

17. Apparatus as claimed in claim 16 including means to position said platform means in response to rotation of said wheel means.

18. The method of transferring blanks of sheet material being successively fed at a high linear rate of speed from a first continuously running conveyor to a receiving means comprising the steps of holding a leading portion of each blank on the periphery of a rotating drum as the blank leaves the end of said conveyor, thereafter holding a trailing portion of each blank on the periphery of the rotating drum, and sequentially releasing, first the leading portion and then the trailing portion of the blank to the control of said receiving means.

19. The method of transferring blanks of sheet material according to claim 18, wherein the peripheral velocity of the blank of sheet material is retarded with respect to the peripheral velocity of the rotating drum during the release of the trailing portion of the blank to said receiving means.

References Cited in the file of this patent

UNITED STATES PATENTS

| | | |
|---|---|---|
| 2,132,227 | Winkler et al. | Oct. 4, 1938 |
| 2,569,976 | Daniels | Oct. 2, 1951 |
| 2,746,364 | Welsh | May 22, 1956 |
| 2,766,985 | Claybourn et al. | Oct. 16, 1956 |

UNITED STATES PATENT OFFICE
CERTIFICATE OF CORRECTION

Patent No. 3,141,667 July 21, 1964

Abraham Novick

It is hereby certified that error appears in the above numbered patent requiring correction and that the said Letters Patent should read as corrected below.

Column 6, line 64, for "chamber", first occurrence, read -- member --.

Signed and sealed this 9th day of February 1965.

(SEAL)
Attest:

ERNEST W. SWIDER
Attesting Officer

EDWARD J. BRENNER
Commissioner of Patents